(12) United States Patent
McBride et al.

(10) Patent No.: US 10,572,357 B2
(45) Date of Patent: Feb. 25, 2020

(54) SWITCHING OVER FROM USING A FIRST PRIMARY STORAGE TO USING A SECOND PRIMARY STORAGE WHEN THE FIRST PRIMARY STORAGE IS IN A MIRROR RELATIONSHIP

(71) Applicant: International Business Machines Corporation, Armonk, NY (US)

(72) Inventors: Gregory E. McBride, Vail, AZ (US); Dash D. Miller, St. Louis Park, MN (US); Miguel A. Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 15/473,603

(22) Filed: Mar. 29, 2017

(65) Prior Publication Data

US 2018/0285223 A1 Oct. 4, 2018

(51) Int. Cl.
*G06F 11/00* (2006.01)
*G06F 11/20* (2006.01)
*G06F 11/16* (2006.01)

(52) U.S. Cl.
CPC ...... *G06F 11/2082* (2013.01); *G06F 11/1662* (2013.01)

(58) Field of Classification Search
CPC .................. G06F 11/2082; G06F 11/1662
See application file for complete search history.

(56) References Cited

U.S. PATENT DOCUMENTS 5,692,155 A * 11/1997 Iskiyan ............... G06F 11/2064
711/162
5,742,792 A * 4/1998 Yanai .................... G06F 3/0601
710/1
6,073,220 A * 6/2000 Gunderson ......... G06F 11/1456
711/112

(Continued)

OTHER PUBLICATIONS

IBM, "DFSMS Introduction", dated 2013, Version 2 Release 1 of z/OS (5650-ZOS), Total 148 pages.

(Continued)

*Primary Examiner* — Marc Duncan
*Assistant Examiner* — Jonathan D Gibson
(74) *Attorney, Agent, or Firm* — David W. Victor; Konrad, Raynes, Davda and Victor LLP

(57) ABSTRACT

A computer program product, system, and method for switching over from using a first primary storage to using a second primary storage when the first primary storage is in a mirror relationship. Migration operations are initiated to migrate data in the first primary storage to a second primary storage while the data in the first primary storage indicated in first change recording information is mirrored to a secondary storage and switch from using the first primary storage to the second primary storage. Resynchronization operations are initiated to indicate changes to data in the second primary storage in a second change recording information, copy writes from the second primary storage indicated in the first and the second change recording information to the secondary storage, and mirror writes to the second primary storage to the secondary storage in response to the copying the writes.

18 Claims, 6 Drawing Sheets

(56) References Cited

U.S. PATENT DOCUMENTS

| | | | |
|---|---|---|---|
| 6,173,377 B1* | 1/2001 | Yanai | G06F 3/0601 711/154 |
| 7,133,983 B2 | 11/2006 | Bartfai et al. | |
| 7,278,049 B2 | 10/2007 | Bartfai et al. | |
| 7,627,729 B2 | 12/2009 | Bartfai et al. | |
| 7,818,522 B2 | 10/2010 | Bartfai et al. | |
| 8,108,337 B2* | 1/2012 | Boyd | G06F 11/2064 707/610 |
| 8,452,933 B2 | 5/2013 | Inoue et al. | |
| 8,706,960 B1 | 4/2014 | Ives et al. | |
| 9,430,162 B1* | 8/2016 | McBride | G06F 3/065 |
| 9,483,366 B2 | 11/2016 | Brown et al. | |
| 9,639,294 B2 | 5/2017 | Prahlad et al. | |
| 10,146,646 B1* | 12/2018 | Foley | G06F 11/1662 |
| 10,228,962 B2* | 3/2019 | Dornemann | G06F 9/45558 |
| 2002/0002638 A1* | 1/2002 | Obara | G06F 3/0601 710/11 |
| 2003/0033494 A1* | 2/2003 | Fujibayashi | G06F 3/0607 711/162 |
| 2005/0193180 A1* | 9/2005 | Fujibayashi | G06F 3/0607 711/162 |
| 2005/0223271 A1* | 10/2005 | Butterworth | G06F 11/2082 714/6.3 |
| 2006/0095696 A1* | 5/2006 | Amano | G06F 11/1471 711/162 |
| 2006/0236048 A1* | 10/2006 | Deguchi | G06F 11/2069 711/162 |
| 2007/0168713 A1* | 7/2007 | Kern | G06F 11/2064 714/12 |
| 2007/0198797 A1 | 8/2007 | Kavuri et al. | |
| 2007/0271430 A1* | 11/2007 | Maki | G06F 11/2066 711/162 |
| 2008/0162590 A1* | 7/2008 | Kundu | G06F 11/1471 |
| 2011/0066801 A1* | 3/2011 | Sato | G06F 3/0605 711/114 |
| 2011/0099342 A1* | 4/2011 | Ozdemir | G06F 11/2066 711/162 |
| 2012/0254114 A1* | 10/2012 | Gundy | G06F 17/30088 707/639 |
| 2013/0080723 A1* | 3/2013 | Sawa | G06F 3/0607 711/162 |
| 2014/0108345 A1* | 4/2014 | Brown | G06F 11/2082 707/624 |
| 2014/0108349 A1* | 4/2014 | Benhase | G06F 11/2082 707/639 |
| 2015/0142738 A1* | 5/2015 | Fujii | G06F 3/0647 707/613 |
| 2015/0286545 A1 | 10/2015 | Brown et al. | |
| 2016/0210202 A1* | 7/2016 | Sinha | G06F 16/00 |
| 2016/0224446 A1* | 8/2016 | Mishuku | G06F 11/2092 |
| 2016/0328303 A1* | 11/2016 | Brandner | G06F 11/1662 |
| 2016/0342490 A1* | 11/2016 | Deguchi | G06F 11/2058 |
| 2018/0113625 A1* | 4/2018 | Sancheti | G06F 3/067 |

OTHER PUBLICATIONS

"Managing Volume Backups With Fast Replication", Version 2.1.0, Retrieved from the Internet on Mar. 4, 2017 from URL>https://www.ibm.com/support/knowledgecenter/en/SSLTBW_2.1.0/com.i . . . Total 2 pages.

B. Dufrasne et al.,"DS8870 Copy Services for IBM z Systems", dated May 2015, Eighth Edition, International Technical Support Organization, Total 764 pages.

K_ Singh et al., "I/O Configuration Using z/OS HCD and HCM", dated Apr. 2010, First Edition, International Technical Support Organization, Total 462 pages.

A. Warmuth et al., "DS8870 Data Migration Techniques", dated Apr. 2015, First Edition, International Technical Support Organization, Total 332 pages.

U.S. Appl. dated Aug. 20, 2019, for U.S. Appl. No. 16/546,297, filed Aug. 20, 2019, Total 32 pages.

Preliminary Amendment, dated Aug. 20, 2019, for U.S. Appl. No. 16/546,297, filed Aug. 20, 2019, Total 10 pages.

List of Patents or Patent Applications Treated as Related, filed Sep. 13, 2019, Total 2 pages.

* cited by examiner

Copy Relationship

US 10,572,357 B2

SWITCHING OVER FROM USING A FIRST PRIMARY STORAGE TO USING A SECOND PRIMARY STORAGE WHEN THE FIRST PRIMARY STORAGE IS IN A MIRROR RELATIONSHIP

BACKGROUND OF THE INVENTION

1. Field of the Invention

The present invention relates to a computer program product, system, and method for switching over from using a first primary storage to using a second primary storage when the first primary storage is in a mirror relationship.

2. Description of the Related Art

In a storage environment, a primary control unit may need to be replaced with a new primary control unit. If the volumes in the primary control unit to replace are being mirrored to secondary volumes, then the mirroring may need to be continued to the secondary volume when the new primary control unit goes online. To initiate the mirroring from the new primary control unit, a NOCOPY mirror may be established from the new primary volume to the secondary volume to start mirroring any new changes at the new primary volume without copying over all the data at the new primary volume as part of a full synchronization or full copy. This avoids the overhead of a full copy from the new primary volume to the secondary volume, which already includes most of the data from the replaced primary volume that was being mirrored to the secondary volume when the mirror from the replaced primary volume to the secondary volume was active.

There is a need in the art for improved techniques for managing the switching over to a new primary control unit and primary volume that is to be mirrored to secondary volumes that were the subject of a previous mirror from the old primary volumes.

SUMMARY

A computer program product, system, and method for switching over from using a first primary storage to using a second primary storage when the first primary storage is in a mirror relationship. Migration operations are initiated to migrate data in the first primary storage to a second primary storage while the data in the first primary storage indicated in first change recording information is mirrored to a secondary storage and switch from using the first primary storage to the second primary storage for host read and write access. Resynchronization operations are initiated to indicate changes to data in the second primary storage in a second change recording information, copy writes from the second primary storage indicated in the first and the second change recording information to the secondary storage, and mirror writes to the second primary storage to the secondary storage in response to the copying the writes indicated in the first and second change recording information to the secondary storage.

DETAILED DESCRIPTION

While switching over from a first primary control unit and volume to a second primary control unit and volume, replacing the first primary control unit, applications in the system may write data to the first primary control unit even after writes are quiesced at the applications as writes are flushed from the host cache. Described embodiments provide techniques to ensure that all writes to the first primary volume are copied to the new second primary volume and to the secondary storage, including those that result from a cache flush after writes are quiesced at the applications.

With described embodiments, changes that occur to the first primary volume during the switch over to the secondary volume are recorded in first and second change recording information for first and second copy relationships, respectively, to copy data from the first primary volume to the secondary volume and from the second primary volume to the secondary volume, respectively. The write data indicated in the first and second change recording information is copied over from the second primary volume to the secondary storage to ensure that all changes to the first primary volume, including those occurring during the switch over, are resynchronized to the secondary volume without having to perform a full synchronization or full copy of the second primary volume to the secondary volume. At the time of switch over, the secondary volume already includes most of the data migrated from the first primary volume as a result of the prior copy relationship from the first primary volume to the secondary volume.

Figure 1:
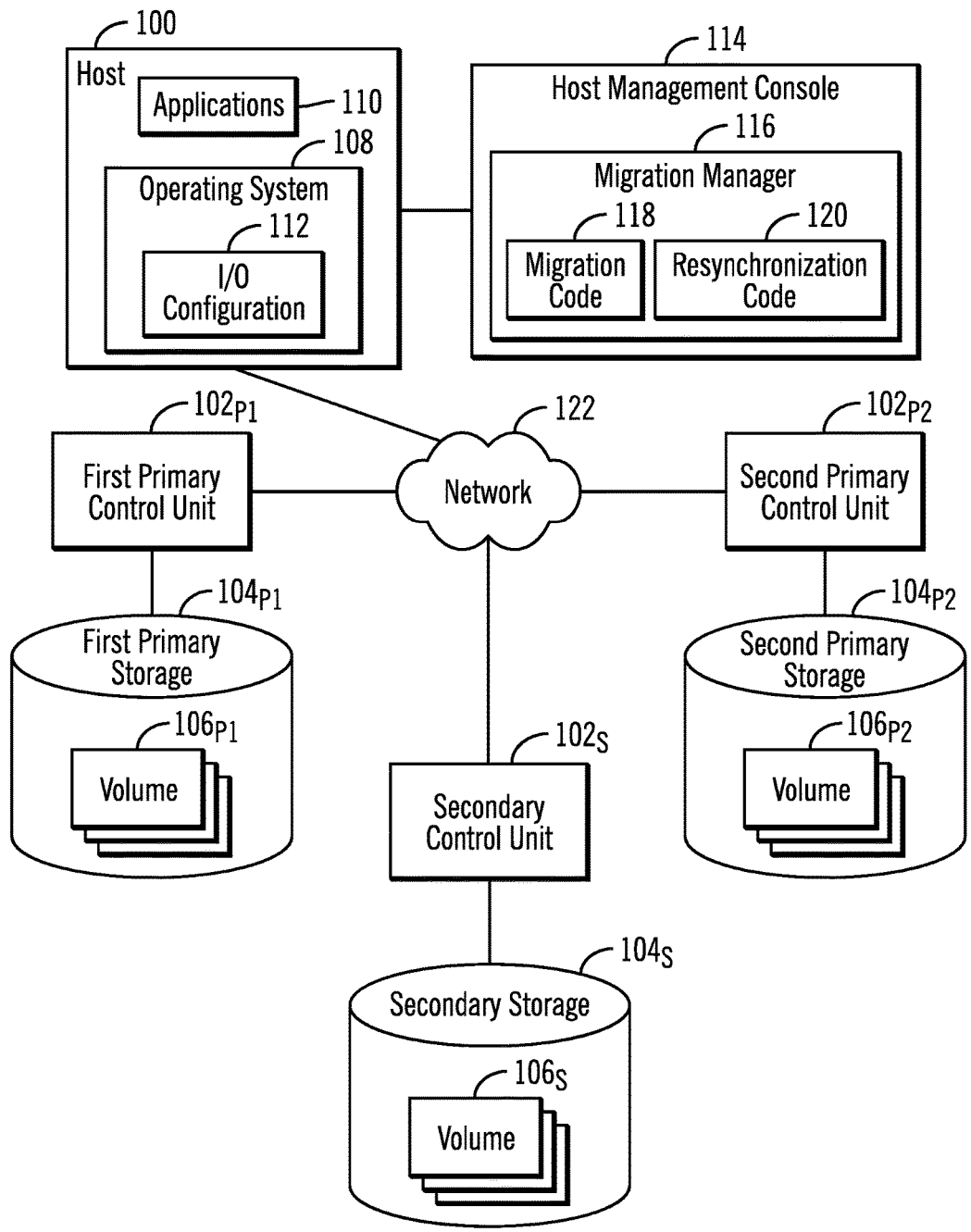
FIG. 1 illustrates an embodiment of a storage environment.

FIG. 1 illustrates an embodiment of a data storage environment having a host system 100 and a plurality of control units $102_{P1}$, $102_{P2}$, $102_S$ each managing storages $104_{P1}$, $104_{P2}$, $104_S$, respectively, each storage having volumes $106_1$, $106_2$, $106_3$. A host 100 operating system 108 directs read and write requests from applications 110 in the host 100, or other systems, to a first primary control unit $100_{P1}$ indicated in Input/Output configuration information 112 The first primary storage $104_{P1}$ has the primary production volume $106_{P1}$. The first primary control unit $102_{P1}$ mirrors data from volumes $106_{P1}$ in the first primary storage $104_{P1}$ to a secondary control unit $102_S$ to store in the secondary storage $104_S$.

In the described embodiments, a system administrator may want to switch from using the first primary control unit $102_{P1}$ as the primary production volume to using a new second primary control unit $102_{P2}$ and second primary storage $104_{P2}$. The new second primary control unit $102_{P2}$ may comprise new or upgraded hardware to deploy in the storage environment.

A host management console 114 may comprise a separate computer system executing a migration manager 116 to manage the migration of a volume $106_{P1}$ from the first primary storage $104_{P1}$ to the second primary storage $104_{P2}$ to switch over to the host 100 using the volumes $106_{P2}$ in the second primary storage $104_{P2}$ and to continue the use of the secondary storage $104_S$ as a mirror of the new second primary storage $104_{P2}$. In one embodiment, the migration manager 116 includes migration code 118 to manage the migration of a first primary volume $106_{P1}$ from the first primary storage $104_{P1}$ to a second primary volume $106_{P2}$ in the second primary storage $104_{P2}$ and resynchronization code 120 to manage resynchronization of any updates to the first primary volume $106_{P1}$ and the second primary volume $106_{P2}$ occurring during the migration to the secondary storage $104_S$ and to activate a second copy relationship to continue to mirror data from the second primary volume $106_{P2}$ to the secondary volume $106_S$.

The host 100 and control units $102_{P1}$, $102_{P2}$, $102_S$ may communicate over a network 122, such as a storage network. The host management console 114 may be directly coupled to the host 100 to configure the host 100 and to configure the mirror copy relationships among the control units $102_{P1}$, $102_{P2}$, $102_S$.

The term "storage system" as used herein may refer to a server $102_1$, $102_2$, $102_3$ and/or the storage $104_1$, $104_2$, $104_3$.

The storages $104_1$, $104_2$, $104_3$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes may further be configured from an array of devices, such as Just a Bunch of Disks (JBOD), Direct Access Storage Device (DASD), Redundant Array of Independent Disks (RAID) array, virtualization device, etc. Further, the storages $104_1$, $104_2$, $104_3$ may comprise heterogeneous storage devices from different vendors and different types of storage devices, such as a first type of storage devices, e.g., hard disk drives, that have a slower data transfer rate than a second type of storage devices, e.g., SSDs.

The network 122 used by the host 100 to access the control units $102_1$, $102_2$, $102_3$ and used by the control units $102_{P1}$, $102_{P2}$, $102_S$ to mirror data may comprise a storage network such as one or more interconnected Local Area Networks (LAN), Storage Area Networks (SAN), Wide Area Network (WAN), peer-to-peer network, wireless network, etc.

Figure 2:
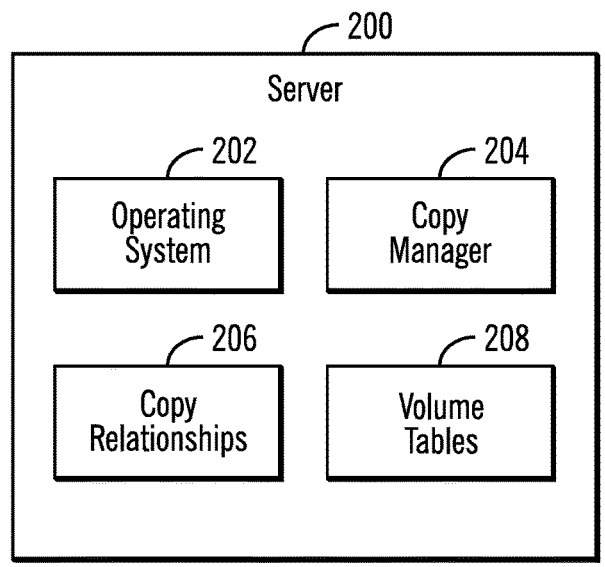
FIG. 2 illustrates an embodiment of components in a system in the storage environment.

FIG. 2 shows the components included in system 200, such as the control units $102_{P1}$, $102_{P2}$, $102_S$ and host 100, including an operating system 202 and a point-in-time copy manager 204 to create and manage copy relationships 206. The host copy manager $204_H$ may instruct the primary control unit copy managers $102_{P1}$ and $102_{P2}$ to create copy relationships 206 to mirror data. The operating systems 202 in the control units $102_{P1}$, $102_{P2}$, $102_S$ assigns extents of tracks in their respective storages $104_{P1}$, $104_{P2}$, $104_S$ to the volumes $106_{P1}$, $106_{P2}$, $106_S$, where data is stored in data units, such as tracks, logical block addresses (LBAs), extents, etc. An extent comprises a grouping of tracks, blocks or other data units that is assigned to volumes $106_{P1}$, $106_{P2}$, $106_S$. The operating systems 202 maintain volume tables 208, such as a volume table of contents (VTOC), file allocation table, etc., providing information on the volumes $106_{P1}$, $106_{P2}$, $106_S$—configured in their respective storages $104_{P1}$, $104_{P2}$, $104_S$. The control unit operating systems 202 further manages I/O requests from the host systems 100 with respect to the their storages $104_{P1}$, $104_{P2}$, $104_S$. The host 100 operating system 202 manages I/O requests from applications 110 in the host 100 and in other hosts directed toward a volume at a control unit $102_{P1}$, $102_{P2}$, $102_S$ indicated in the I/O configuration 112.

Figure 3:
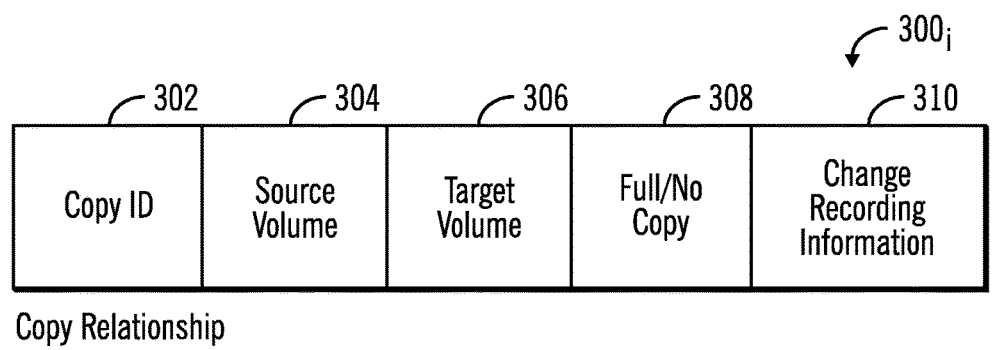
FIG. 3 illustrates an embodiment of copy relationship information.

FIG. 3 illustrates an instance of a copy relationship $300_i$ for a mirror copy operation, which may include a copy identifier 302 identifying the mirror copy created by the copy manager 204 at a primary control unit $102_{P1}$, $102_{P2}$; a source volume 306, e.g., first or second primary volume $106_{P1}$, $106_{P2}$, at a first or second primary control unit $102_{P1}$, $102_{P2}$, from which data is copied; a target a volume 308, e.g., second primary volume $106_{P2}$, secondary volume $106_S$, to which the data is copied; a Full or No Copy field 310 indicating whether a full copy is to be made from the source volume 306 to the target volume 308, or a "No Copy" mirroring where the full source volume 306 is not mirrored to the target volume 308, and only changes that occur to the source volume 306 after the mirror copy is initiated are copied; change recording information 312, such as a change recording bitmap, indicating data in the source volume 306 to copy to the target volume 308. For a Full Copy, the change recording information 312 would indicate to copy over the entire source volume 306 and would be updated to indicate tracks updated in the source volume 306. For a "No Copy" operation, the change recording information 312 does not indicate to copy all the tracks in the source volume 306 and instead only indicates to copy a track or data unit when that track is updated or changed, so that only changed data is mirrored after the mirror is started.

The creation of a copy relationship $300_i$ is instantaneous and allows host 100 application 110 to continue accessing source volume 306 of the copy relationship $300_i$ while actual mirroring of data to the secondary storages may occur in the background. The point-in-time copy establishment appears instantaneous because the primary copy manager $204_{P1,P2}$ returns I/O complete to the host copy manager $2004_H$ in response to generating the relationship $300_i$ data structures without copying the data.

Figure 4:
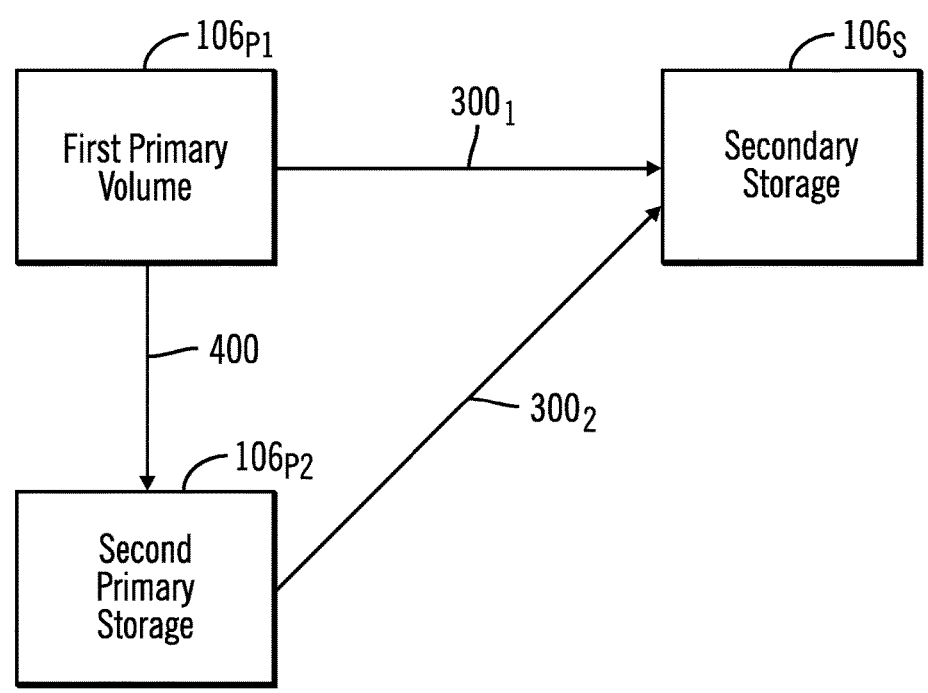
FIG. 4 illustrates an embodiment of copy relationships between volumes in the storage environment.

FIG. 4 illustrates an embodiment of mirror copy relationships where a first primary volume $106_{P1}$, such as in the first primary storage $104_{P1}$, comprises a primary production volume, that mirrors data to a secondary volume $106_S$, which provides a full mirrored copy of the first primary volume $106_{P1}$ as a backup copy according to a first copy relationship $300_1$. At some point, an administrator may want to replace the first primary control unit $102_{P1}$ with an upgraded second primary control unit $102_{P2}$ to use a secondary primary volume $106_{P2}$ as the main production volume. To accomplish this according to the embodiments described below, the migration manger 114 at a host management console 114 or other system, copies data from the first primary volume $106_{P1}$ to the new second primary volume $106_{P2}$ as shown by copy operation 400. This copy operation 400 may or may not comprise a copy relationship $300_i$ as described with respect to FIG. 3. The migration manager 116 may further create a second copy relationship $300_2$ to mirror only changed data, not a full copy, from the second primary volume $106_{P2}$, which will replace the first primary volume $106_{P1}$, to the secondary volume $106_S$ to continue the mirroring to the secondary volume $106_S$ after the swap to the second primary control unit $102_{P2}$ and second primary volume $106_{P2}$ are completed.

In one embodiment, the first primary volume $106_{P1}$, the second primary volume $106_{P2}$, and secondary volume $106_S$ may each be on storages $104_{P1}$, $104_{P2}$, $104_S$ on separate control units $102_{P1}$, $102_{P2}$, $102_S$. In alternative embodiments, one or more of the volumes $106_{P1}$, $106_{P2}$, $106_S$ may be located on a same storage and/or control unit.

Figure 5:
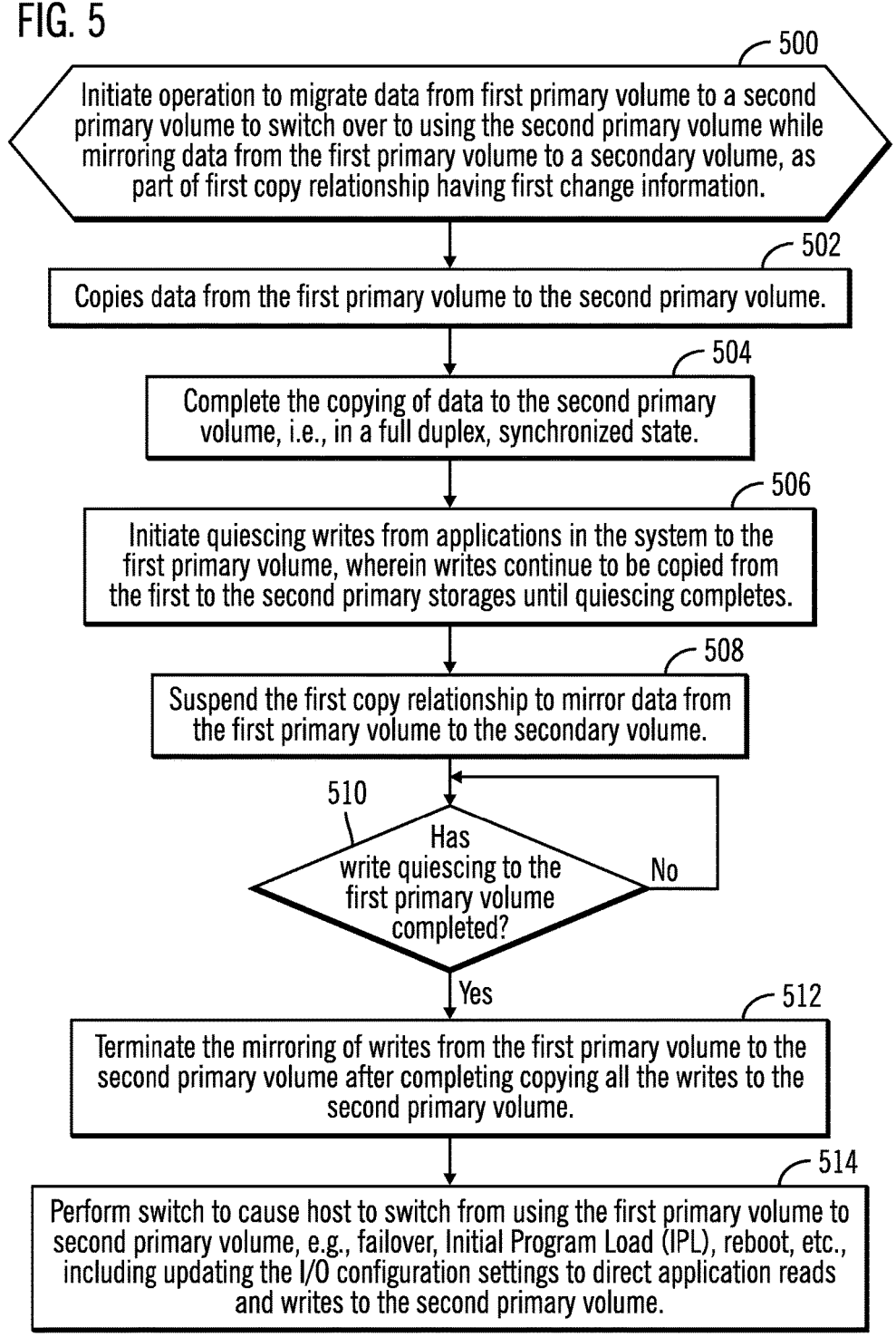
FIG. 5 illustrates an embodiment of operations to initiate migration of data from a first primary volume to a second primary volume to replace the first primary volume in the storage environment.

FIG. 5 illustrates an embodiment of operations performed by the migration manager 116 when executing the migration code 118 in the host management console 114, or some other component or components, to initiate a migration from a first primary control unit $102_{P1}$ having a first primary volume $106_{P1}$ used for host application 110 reads and writes to a second primary control unit $102_{P2}$ having a second primary volume $106_{P2}$ that will replace the first primary volume $106_{P1}$ as the main production volume used by host applications 110. The operations of FIGS. 5 and 6 may be performed for multiple first primary volumes $106_{P1}$ in the first primary storage $104_{P1}$ to migrate to second primary volumes $106_{P2}$ in the second primary storage $106_{P2}$. Upon initiating (at block 500) the operation to migrate data from a first primary volume $106_{P1}$ to a second primary volume $106_{P2}$ while mirroring data to a secondary volume $106_S$, as part of first copy relationship $300_1$ having first change recording information $312_1$, the migration manager 116 copies (at block 502) data from the first primary volume $106_{P1}$ to the second primary volume $106_{P2}$. Although operations are described with respect to volumes $106_{P1}$, $106_{P2}$, and $106_S$, operations may be performed with respect to logical groups of data other than volumes in the first, second, and secondary storages.

After completing (at block 504) the copying of the data to the second primary volume $106_{P2}$, which occurs after the data is in a full synchronized or full duplex state, the migration manager 116 initiates (at block 506) a quiescing of writes (at block 506) from the host application 110 to the first primary volume $106_{P1}$ and suspends (at block 508) the first copy relationship $300_1$ to mirror data from the first primary volume $106_{P1}$ to the secondary volume $106_S$. After the quiescing of writes and suspension of the first copy relationship $300_1$ are initiated, straggling writes may come into the first primary control $102_{P1}$ unit when flushed from a host cache 100. Such straggling writes may be recorded in the first change recording information 312 for the suspended first copy relationship $300_1$ and copied to the second primary volume $106_{P2}$ as part of the copy operation 400.

A determination is made (at block 510) whether quiescing has completed. This determination may be made in response to a quiesce timer expiring, which would expire after a time during which any writes in the host 100 cache would be expected to have been flushed to the first primary control unit $102_{P1}$ after the applications stopped sending writes in response to initiating the quiescing. After the quiescing has completed, the mirroring of writes as part of copy operation 400 from the first primary volume $106_{P1}$ to the second primary volume $106_{P2}$ is terminated (at block 512) after completing all the writes at the first primary volume $106_{P1}$ to the second primary volume $106_{P2}$.

The migration manager 116 then performs a switch (at block 514) to cause the host 100 to switch from using the first primary volume $106_{P1}$ for reads and writes to using the second primary volume $106_{P1}$. This switch operation at the host 100 may comprise a failover to the secondary primary volume $106_{P1}$, Initial Program Load (IPL), reboot, etc., and would include updating the I/O configuration settings 112 to direct application reads and writes to the second primary volume $106_{P2}$. The host 100 may comprise a virtual or physical host.

Figure 6:
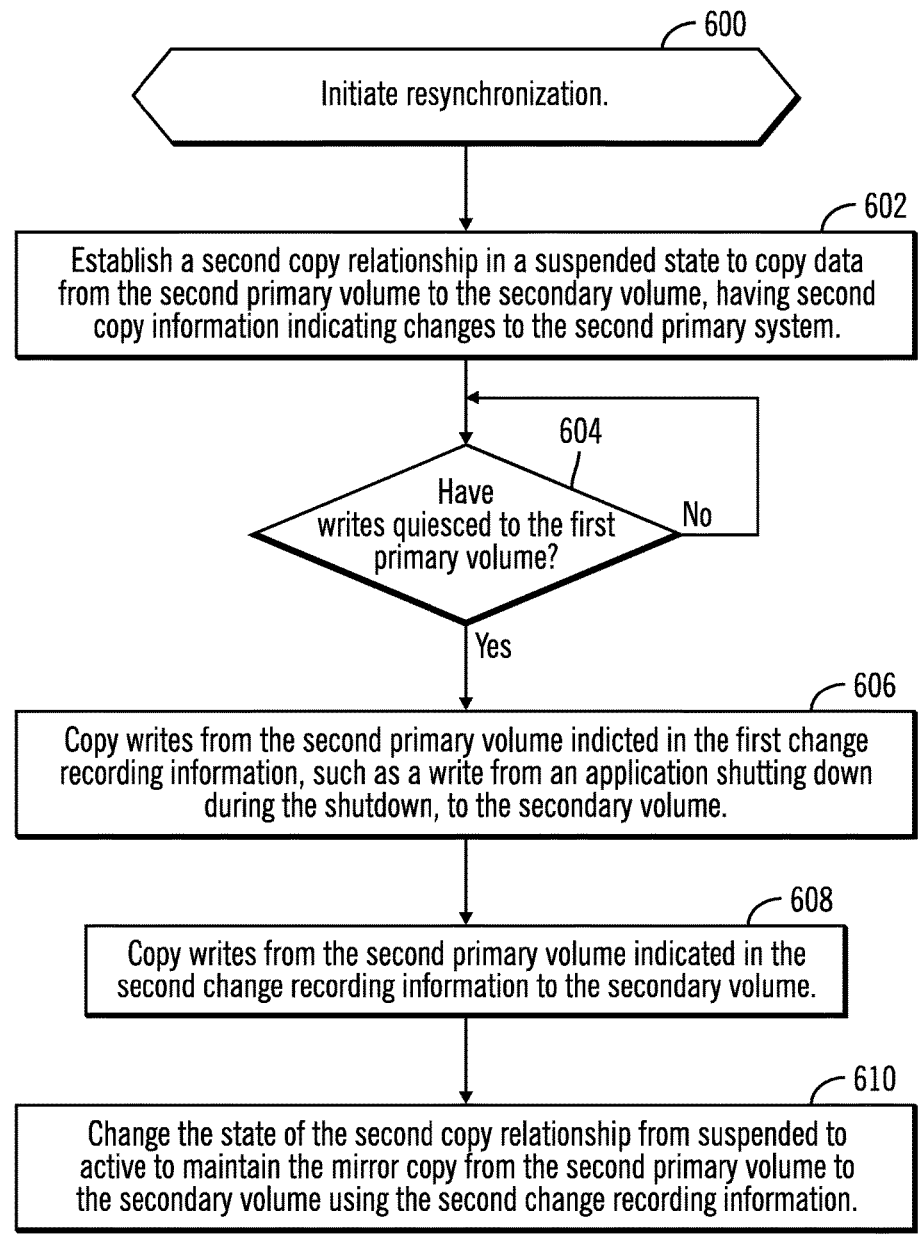
FIG. 6 illustrates an embodiment of operations to resynchronize data from the new second primary volume to a secondary volume to which data was mirrored from the first primary volume being replaced.

FIG. 6 illustrates an embodiment of operations performed by the migration manager 116 when executing the resynchronization code 120 in the host management console 114, or some other component or components, to initiate operations to resynchronize from the second primary volume $106_{P2}$ to the secondary volume $106_S$ after switching over from the first primary volume $106_{P1}$ to the second primary volume $106_{P2}$ The resynchronization code 120 may be executed concurrently with the migration code 118. Upon initiating resynchronization (at block 600), the migration manager 116 establishes (at block 602) a second copy relationship $300_2$ in a suspended state to copy data form the second primary volume $106_{P2}$ to the second primary volume $106_{P1}$ storage, having second change recording information $312_2$ indicating changes to the second primary volume $106_{P2}$. In one embodiment, the second copy relationship $300_2$ comprises a NO COPY relationship, where only changes to the second primary volume $106_{P2}$ after the mirror is established are copied over because in the described embodiments, the secondary volume $106_S$ already has a copy of the data from the first primary volume $102_{P1}$ as part of the first copy relationship $300_3$, which is a FULL copy relationship. While the second copy relationship $300_2$ suspended, data is not copied form the second primary volume $106_{P2}$ to the secondary storage $106_S$. However, changes to the second primary volume $106_{P2}$ are recorded in the second change recording information $312_2$. This allows the changed data to be copied over to the secondary volume $106_S$ when the second copy relationship $300_2$ is made active.

After creating the suspended copy relationship $300_2$, the migration manager 116 determines (at block 604) whether writes quiesced as a result of the write quiescing initiated by the migration code 118 at block 506 in FIG. 5, such as performed as described at block 510. If (at block 604) the writes have quiesced, then the migration manager 116 copies (at block 606) writes indicted in the first change recording information 312 of the first copy relationship $300_1$, such as a straggling write flushed from the host 100 cache after quiescing of writes initiated, to the secondary volume $106_S$. The writes indicated in the first change recording information $312_1$ may be written from the second primary volume $106_{P1}$, which has all data written from the first primary volume $106_{P1}$ as part of the copy operation 400. Alternatively, the writes indicated in the first change recording information $312_1$ may be copied from the first primary volume $106_{P1}$. The straggling writes would have been copied to the second primary value $106_{P1}$ as part of the copy operation 400 which copies writes from the first $106_{P1}$ to the second $106_{P2}$ volumes. The migration manager 116 further copies (at block 608) writes from the second primary volume $106_{P2}$ indicted in the second change recording information 312 of the second copy relationship $300_2$ to the secondary volume $106_S$.

After copying the data indicated in the first $312_1$ and second $312_2$ change recording information, the migration manager 116 changes (at block 610) the state of the second copy relationship $300_2$ from suspended to active. Changing the state of the second copy relationship $300_2$ to active activates the mirroring of data from the secondary primary volume $106_{P2}$ to the secondary volume $106_S$ using the second change recording information $312_2$.

With the described embodiments, both the migration operations 118 and resynchronization operations 120 may occur in parallel and both coordinate to wait until writes have quiesced before proceeding with operations depending upon completion of the writes quiescing. This coordination is accomplished by both the migration 118 and resynchronization 120 processes waiting for write quiescing to the first primary volume 106$_{P1}$ to have completed at certain points. This waiting for write quiescing to complete ensures that any straggling writes to the first primary volume 106$_{P1}$ will have been copied to the second primary volume 106$_{P2}$ and resynchronized to the secondary volume 106$_S$.

In an alternative embodiment, the migration manager 116 may merge the first change recording information 312$_1$, indicating changes to the first primary volume 106$_{P1}$ written by applications 110 after quiescing, with the second change recording information 312$_2$ to form merged second change recording information 312$_2$. Upon changing the state of the second copy relationship 300$_2$ to active, the copy manager 204 of the second primary control unit 102P$_2$ may then copy data from the second primary volume 106$_{P2}$ indicated in the merged change recording information as changed.

With the operations of FIGS. 5 and 6, any writes that the applications 110 perform during the shutdown and after restarting before the failover that are not mirrored over to the secondary storage 104$_S$ get indicated in the second change recording information 312$_2$, to be copied to the secondary volume 106$_S$ during resynchronization. With the described embodiments, the new second primary volume 106$_{P2}$ does not need to copy over all data to the new secondary volume 106$_S$, such as a Full Copy, because the secondary volume 106$_S$ already has most of the data from the copying 400, and only updates that occur while writes are quiescing, such as from a cache flush at the host 100, are copied from the second primary volume 106$_{P2}$ to fully synchronize the secondary volume 106$_S$.

The reference characters used herein, such as i, P1, P2, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
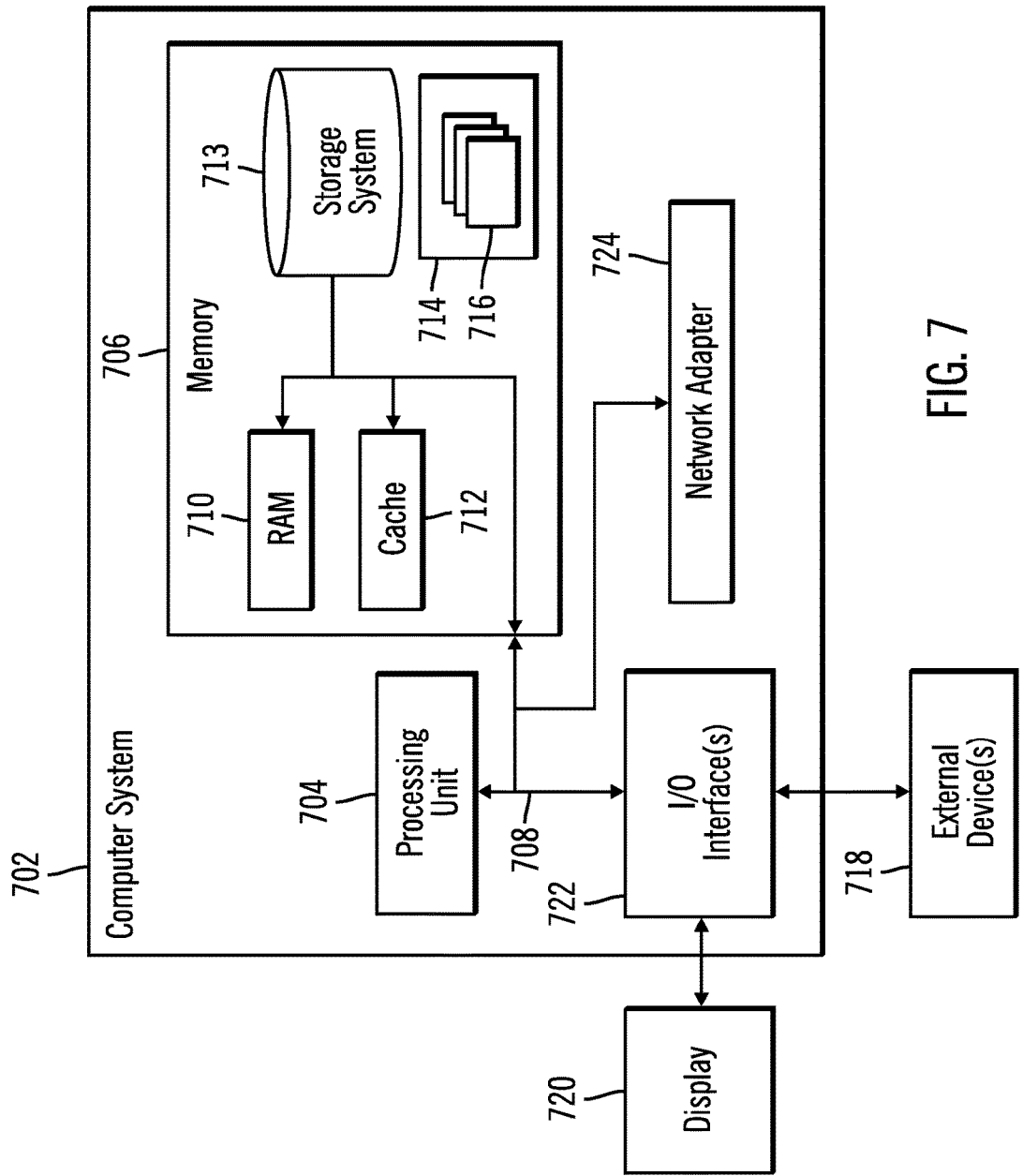
FIG. 7 illustrates a computing environment in which the components of FIG. 1 may be implemented.

The computational components of FIG. 1, including the primary control units $102_{P1}$, $102_{P2}$, $102_S$ and host 100 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for switching from a first primary storage, used by a system, with a second primary storage, wherein the computer program product comprises a computer readable storage medium having program instructions embodied therewith to communicate with the first primary storage, the second primary storage, and a secondary storage, that when executed cause operations, the operations comprising:
    initiating migration operations comprising:
        migrating data in the first primary storage to the second primary storage while the data in the first primary storage indicated in first change recording information is mirrored to the secondary storage;
        initiating quiescing of writes to the first primary storage after synchronizing between the first primary storage and the second primary storage; and
        switching from using the first primary storage to the second primary storage for host read and write access; and
    initiating resynchronization operations while waiting for the quiescing of the writes, comprising:
        indicating, in second change recording information, changes to data in the second primary storage resulting from copying writes from the first primary storage that occur after initiating the resynchronization operations and while waiting for completion of the quiescing of writes to the first primary storage in a second change recording information;
        determining whether writes completed quiescing to the first primary storage;
        copying writes from the second primary storage indicated in the first and the second change recording information to the secondary storage in response to the determining that the writes completed quiescing to the first primary storage; and
        mirroring writes to the second primary storage to the secondary storage in response to the copying the writes indicated in the first and second change recording information to the secondary storage.

2. The computer program product of claim 1, wherein the migration operations and resynchronization operations are performed concurrently.

3. The computer program product of claim 1, wherein the switching from using the first primary storage to the second primary storage for receiving host read and write requests is performed in response to completing the quiescing of writes.

4. The computer program product of claim 3, wherein the operations further comprise:
    maintaining a first copy relationship including the first change recording information to mirror data from the first primary storage to the secondary storage; and
    wherein the migrating operations further comprise suspending the first copy relationship in response to the quiescing of writes.

5. The computer program product of claim 3, wherein writes to the first primary storage that occur after the initiating the quiescing of writes and before the completing the quiescing of writes are indicated in the first change recording information and copied to the second primary storage as part of the migration operations of migrating the data in the first primary storage to the second primary storage.

6. The computer program product of claim 1, wherein the resynchronization operations further comprise:
    merging the first and the second change recording information into merged change recording information to indicate data as changed that was indicated as changed in the first and the second change recording information, wherein the copying the writes from the second primary storage to the secondary storage comprises copying data indicated in the merged change recording information as changed.

7. The computer program product of claim 1, further comprises:
    maintaining a first copy relationship including the first change recording information to mirror data from the first primary storage to the secondary storage, wherein the first copy relationship existed prior to performing the migration operations; and
    wherein the resynchronization operations further comprise:
        establishing a second copy relationship in a suspended state to copy data for the mirroring of the writes from the second primary storage to the secondary storage, wherein, in the suspended state, writes to the second primary storage are not copied to the secondary storage and the second change recording information indicates changes made to the second primary storage during the suspended state; and
        changing the suspended state of the second copy relationship to an active state in response to copying the writes indicated in the first and second change recording information to the secondary storage, wherein data indicated as changed in the second change recording information is mirrored from the second primary storage to the secondary storage in response to being in the active state.

8. The computer program product of claim 1, wherein the first primary storage is managed by a first primary control unit, wherein the second primary storage is managed by a second primary control unit, wherein the secondary storage is managed by a secondary control unit, wherein the migration and the resynchronization operations are performed with respect to a first primary volume in the first primary storage, a second primary volume in the second primary storage, and secondary volume in the secondary storage, and wherein the second primary control unit comprises an upgraded version of the first primary control unit.

9. A system for switching from using a first primary storage with a second primary storage and further in communication with a secondary storage, comprising:
a processor; and
a computer readable storage medium having program instructions embodied therewith that when executed by the processor cause operations, the operations comprising:
initiating migration operations comprising:
migrating data in the first primary storage to the second primary storage while the data in the first primary storage indicated in first change recording information is mirrored to a secondary storage;
initiating quiescing of writes to the first primary storage after synchronizing between the first primary storage and the second primary storage; and
switching from using the first primary storage to the second primary storage for host read and write access; and
initiating resynchronization operations while waiting for the quiescing of the writes, comprising:
indicating, in second change recording information, changes to data in the second primary storage resulting from copying writes from the first primary storage that occur after initiating the resynchronization operations and while waiting for completion of the quiescing of writes to the first primary storage in a second change recording information;
determining whether writes completed quiescing to the first primary storage;
copying writes from the second primary storage indicated in the first and the second change recording information to the secondary storage; and
mirroring writes to the second primary storage to the secondary storage in response to the copying the writes indicated in the first and second change recording information to the secondary storage.

10. The system of claim 9, wherein the migration operations and resynchronization operations are performed concurrently.

11. The system of claim 9, wherein the switching from using the first primary storage to the second primary storage for receiving host read and write requests is performed in response to completing the quiescing of writes.

12. The system of claim 11, wherein writes to the first primary storage that occur after the initiating the quiescing writes and before the completing the quiescing writes are indicated in the first change recording information and copied to the second primary storage as part of the migration operations of migrating the data in the first primary storage to the second primary storage.

13. The system of claim 9, further comprises:
maintaining a first copy relationship including the first change recording information to mirror data from the first primary storage to the secondary storage, wherein the first copy relationship existed prior to performing the migration operations; and
wherein the resynchronization operations further comprise:
establishing a second copy relationship in a suspended state to copy data for the mirroring of the writes from the second primary storage to the secondary storage, wherein, in the suspended state, writes to the second primary storage are not copied to the secondary storage and the second change recording information indicates changes made to the second primary storage during the suspended state; and
changing the suspended state of the second copy relationship to an active state in response to copying the writes indicated in the first and second change recording information to the secondary storage, wherein data indicated as changed in the second change recording information is mirrored from the second primary storage to the secondary storage in response to being in the active state.

14. A method for switching from a first primary storage, used by a system, to a second primary storage, comprising:
initiating migration operations comprising:
migrating data in the first primary storage to the second primary storage while the data in the first primary storage indicated in first change recording information is mirrored to a secondary storage; and
switching from using the first primary storage to the second primary storage for host read and write access;
initiating quiescing of writes to the first primary storage after synchronizing between the first primary storage and the second primary storage; and
initiating resynchronization operations while waiting for the quiescing of the writes, comprising:
indicating, in second change recording information, changes to data in the second primary storage resulting from copying writes from the first primary storage that occur after initiating the resynchronization operations and while waiting for completion of the quiescing of writes to the first primary storage in a second change recording information;
determining whether writes completed quiescing to the first primary storage;
copying writes from the second primary storage indicated in the first and the second change recording information to the secondary storage; and
mirroring writes to the second primary storage to the secondary storage in response to the copying the writes indicated in the first and second change recording information to the secondary storage.

15. The method of claim 14, wherein the migration operations and resynchronization operations are performed concurrently.

16. The method of claim 14, wherein the switching from using the first primary storage to the second primary storage for receiving host read and write requests is performed in response to completing the quiescing of writes.

17. The method of claim 16, wherein writes to the first primary storage that occur after the initiating the quiescing writes and before the completing the quiescing writes are indicated in the first change recording information and copied to the second primary storage as part of the migration operations of migrating the data in the first primary storage to the second primary storage.

18. The method of claim 14, further comprises:
maintaining a first copy relationship including the first change recording information to mirror data from the first primary storage to the secondary storage, wherein the first copy relationship existed prior to performing the migration operations; and wherein the resynchronization operations further comprise:
establishing a second copy relationship in a suspended state to copy data for the mirroring of the writes from the second primary storage to the secondary storage, wherein, in the suspended state, writes to the second primary storage are not copied to the secondary storage and the second change recording information indicates changes made to the second primary storage during the suspended state; and changing the suspended state of the second copy relationship to an active state in response to copying the writes indicated in the first and second change recording information to the secondary storage, wherein data indicated as changed in the second change recording information is mirrored from the second primary storage to the secondary storage in response to being in the active state.

* * * * *